(No Model.) 4 Sheets—Sheet 1.

T. H. SAVERY.
COMPOUND DRIVING GEAR.

No. 542,897. Patented July 16, 1895.

WITNESSES:
C. Neveux
Theo. G. Hosking

INVENTOR
T. H. Savery
BY
Munn & Co.
ATTORNEYS.

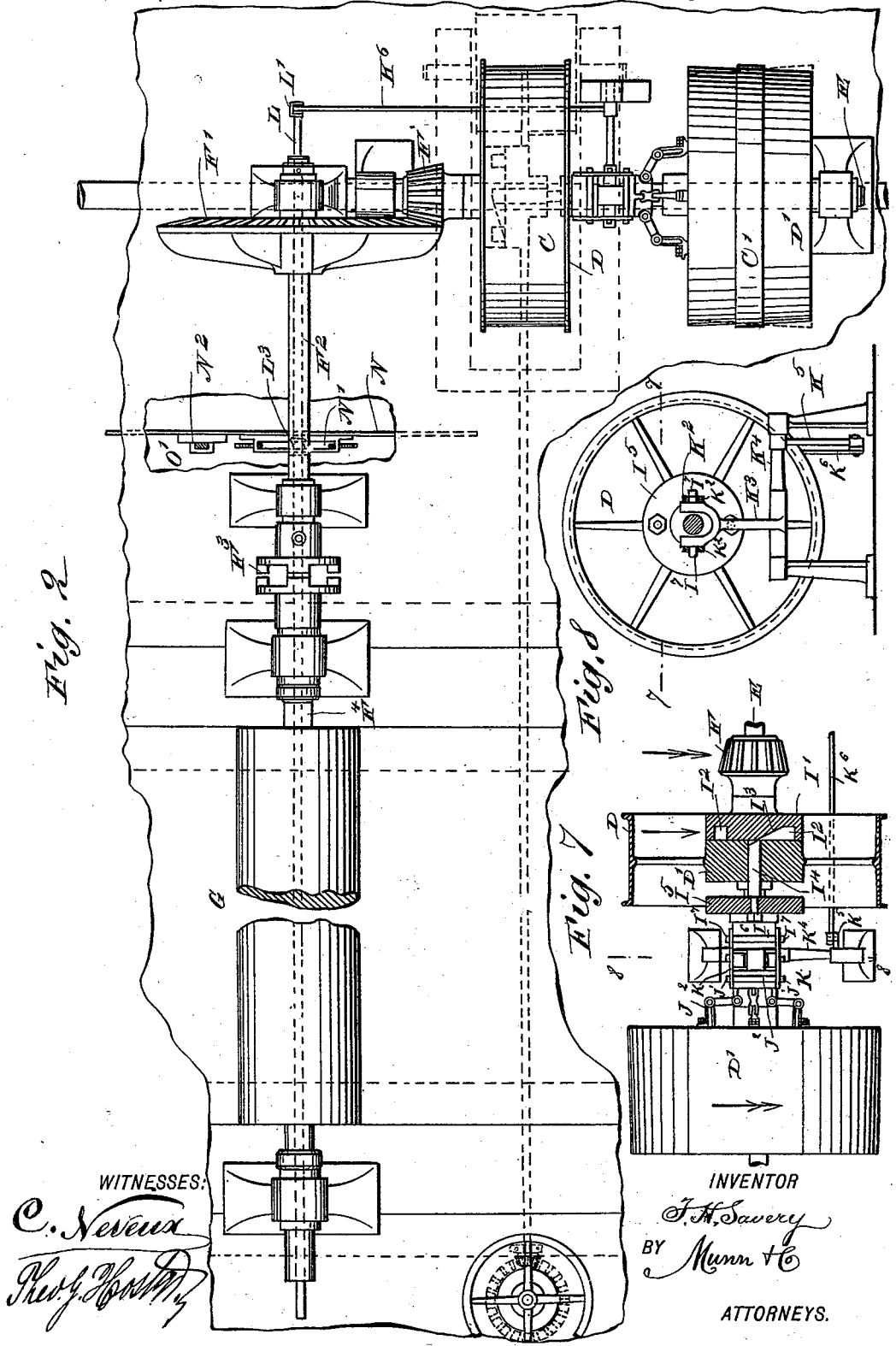

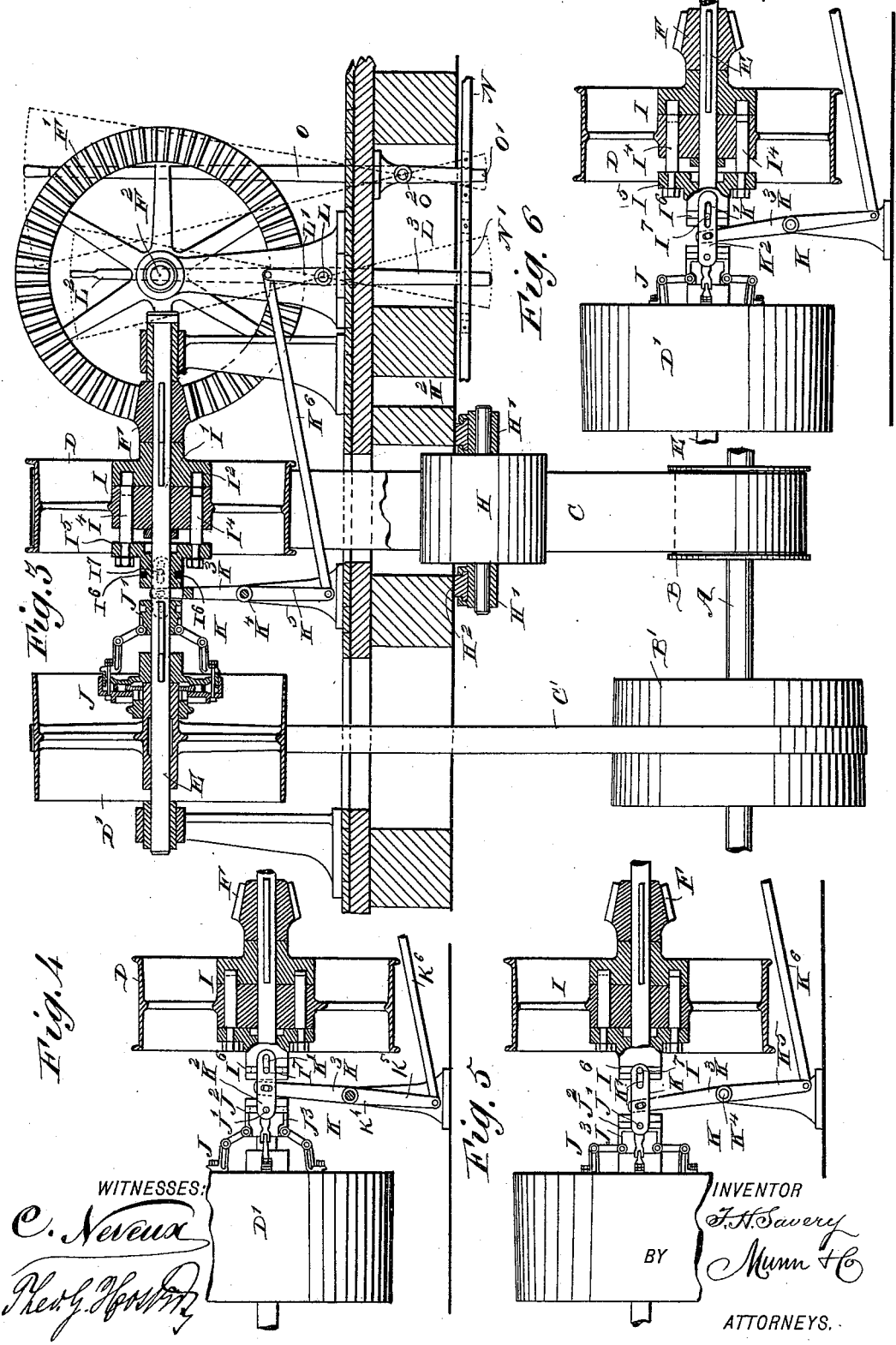

(No Model.) 4 Sheets—Sheet 4.

T. H. SAVERY.
COMPOUND DRIVING GEAR.

No. 542,897. Patented July 16, 1895.

WITNESSES:
C. Neveux
Theo. G. Hoster

INVENTOR
T. H. Savery
BY
Munn & Co
ATTORNEYS.

United States Patent Office.

THOMAS H. SAVERY, OF WILMINGTON, DELAWARE.

COMPOUND DRIVING-GEAR.

SPECIFICATION forming part of Letters Patent No. 542,897, dated July 16, 1895.

Application filed August 23, 1894. Serial No. 521,114. (No model.)

*To all whom it may concern:*

Be it known that I, THOMAS H. SAVERY, of Wilmington, in the county of New Castle and State of Delaware, have invented a new and Improved Compound Driving-Gear for Paper-Making Machines, of which the following is a full, clear, and exact description.

The invention relates to paper-machines comprising the couchers, first press, second press, driers, and calendars, and its object is to provide a new and improved compound driving device arranged in such a manner that the main-line shaft, as well as the above-enumerated single machines, can be driven at a very fast speed and started simultaneously or singly, as desired, and without danger of shock.

The invention consists principally of a fast-speed pulley and a slow-speed pulley, both adapted to be connected with the driving-shaft of the machine, a friction-clutch for locking the said fast-speed pulley to the driving-shaft, and a positive clutch for locking the slow-speed pulley to the driving-shaft, the said clutches being so arranged that either clutch can be engaged at will, that the positive or slow-driving clutch will not be disengaged before the friction or fast-driving clutch is put in engagement, and that, if desired, neither clutch will be in engagement.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
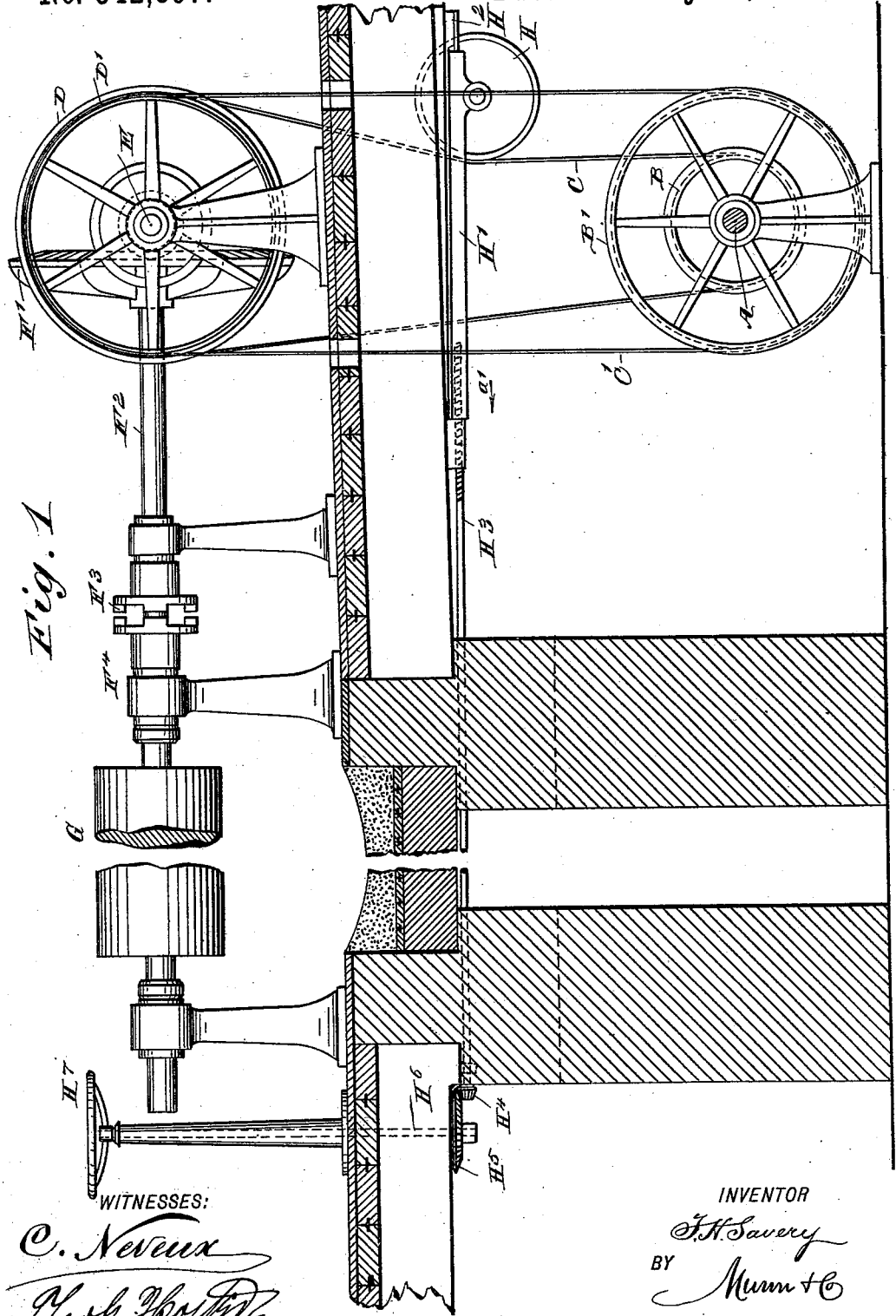
Figure 9:
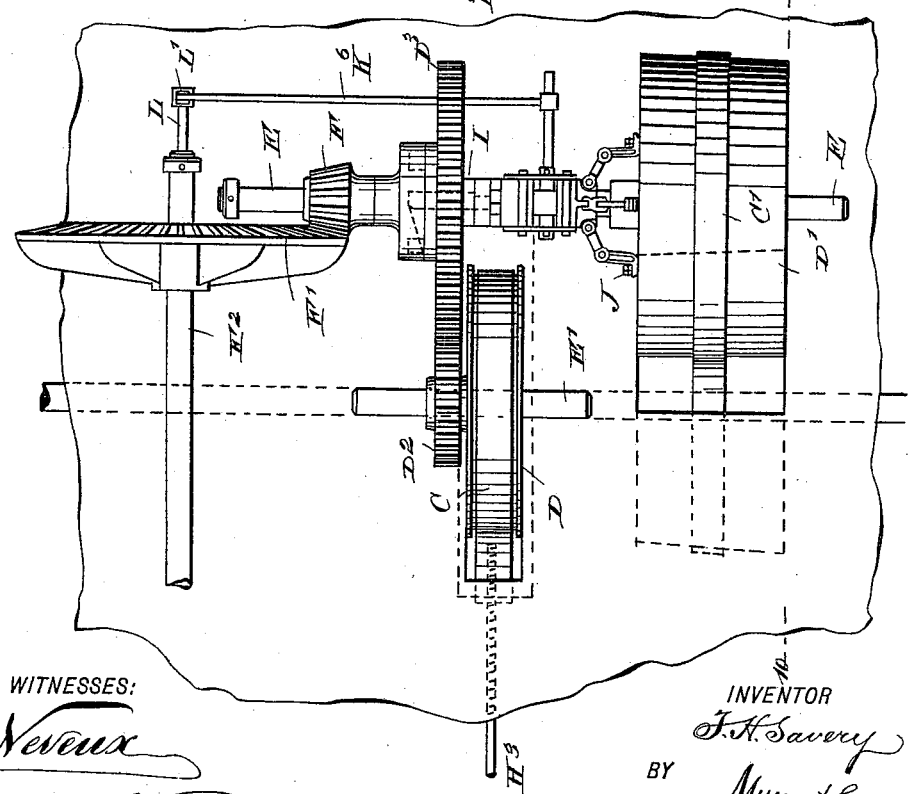

Figure 1 is a transverse section of the improvement. Fig. 2 is a plan view of the same. Fig. 3 is a sectional side elevation of the same, showing both clutches out of engagement. Fig. 4 is a sectional side elevation of the two clutches and pulleys on the driving-shaft and showing the positive clutch in engagement with the slow-speed pulley. Fig. 5 is a similar view of the same, showing the friction-clutch in engagement with the fast-speed cone-pulley and the positive clutch still in engagement with the slow-speed pulley. Fig. 6 is a similar view of the same with the friction-clutch in engagement with the fast-speed pulley and the positive clutch out of engagement with the slow-speed pulley. Fig. 7 is a sectional plan view of the same on the line 7 7 of Fig. 8. Fig. 8 is a plan view of a modified form of part of the improvement, and Fig. 9 is a cross-section of the same on the line 10 10 of Fig. 8.

In the cone-driving mechanism for paper-making machines as heretofore constructed a main driving-belt was employed and shifted into different positions on the cone to increase or diminish the speed of the main-line shaft to change the speed of the several individual machines; The difference in speed was limited according to the length of the cone-pulleys and usually amounted to about fifty per cent.—that is to say, if the lowest or slow speed was one hundred feet per minute the highest obtainable speed was only one hundred and fifty per minute.

In all paper-machines heretofore constructed either cones as described above or some equivalent mechanism is employed to cause the main-line shaft, which drives the several parts of the paper-machine, to revolve at a speed which will produce the requisite lineal speed of the parts making the paper. In the mechanism connecting this main-line shaft with each of these sections there is placed somewhere a friction-clutch, so that any one or all the sections can be stopped or started at pleasure.

In a nest of driers belonging to a large paper-machine the moving parts weigh about fifty tons, and in order to start these parts from a state of rest by the cone-pulleys and belt above referred to to a speed of five feet per second, requires considerable power and practically limits the speed of the paper-machines to three hundred feet per minute. To overcome this difficulty and to make it practical to run a paper-machine at a considerably higher speed—say five hundred feet or more per minute—and to permit of starting the individual machines easily and in a very gradual manner and without danger of shock, I provide the compound driving arrangement presently to be described in detail, it being understood that this driving arrangement can be used between the shaft driven by the engine and the main-line shaft and also between the latter and the individual machines composing the entire paper-making machine. In the drawings, the driving arrangement is located between the main-line shaft and one of the individual machines.

The main-line shaft A, for furnishing the power for the several individual machines in the paper-making machine, is provided for each individual machine with the two pulleys B and B', of which the latter is considerably larger in diameter than the pulley B, as is plainly illustrated in Figs. 1 and 3. The pulleys B and B' are connected by the belts C and C', respectively, with the slow-speed pulley D and and the fast-speed pulley D', both mounted to rotate loosely on the driving-shaft E, carrying at one end a beveled pinion F in mesh with the beveled gear-wheel F', secured on the transversely-extending shaft $F^2$, adapted to be connected by the coupling $F^3$ with the shaft $F^4$, forming the driving-shaft of the individual machine G to be driven and forming a part of the entire paper-making machine.

The pulleys B' and D' are connected with each other by a narrow belt C', while the belt C is wide and strong to do the hard work encountered in starting the machine from a state of rest to a comparatively slow speed. The belt C, connecting the pulleys B and D with each other, is engaged by a belt-tightening pulley H, journaled in a frame H', mounted to slide transversely in suitable guideways $H^2$ held on the building in which the machine is located. The frame H' is engaged by a screw-rod $H^3$, journaled in suitable bearings and carrying at one end a pinion $H^4$, (see Fig. 1,) in mesh with the bevel gear-wheel $H^5$, carried on the lower end of the vertically-disposed shaft $H^6$, carrying at its upper end a hand-wheel $H^7$ under the control of the operator, so that on turning the said hand-wheel in one direction the screw-rod $H^3$ is rotated to move the frame H', and consequently the tightening-pulley H, in the direction of the arrow $a'$, to tighten the belt C; and when the said hand-wheel $H^7$ is turned in an opposite direction then the frame H' and the tightening-pulley H are moved in the inverse direction of the arrow $a'$ to slacken the belt C.

The slow-speed pulley D is adapted to be locked to the driving-shaft E by a positive clutch I, and the fast-speed driving-pulley D' is adapted to be locked to the said driving-shaft E by a friction-clutch J, and both clutches I and J are connected with a shifting device K under the control of the operator and hereinafter more fully described.

The positive clutch I is provided with a disk I', keyed on the shaft E between the beveled pinion F and the hub of the slow-speed pulley D, as is plainly illustrated in the drawings. In the face of the disk I', adjacent to the hub of the slow-speed pulley D, are formed recesses $I^2$, having inclined backs $I^3$, as plainly illustrated in Fig. 7. The recesses are adapted to be engaged by clutch pins or bars $I^4$, fitted to slide longitudinally in suitable bearings arranged in the hub of the slow-speed pulley D. The outer ends of the clutch-bars $I^4$ are connected with a disk $I^5$, held loosely on the shaft E and provided with a loose shifting ring $I^6$, having projecting trunnions or pins $I^7$, fitted into longitudinal slots K', formed in connecting-links $K^2$ for connecting the two clutches I and J with each other. The connecting-links $K^2$ engage pins J', projecting from a shifting ring $J^2$, held loosely on the sleeve $J^3$, mounted to slide on and turn with the shaft E and forming part of the friction-clutch J of any approved construction, provided that the clutch itself be of such construction that the said sleeve $J^3$ can be moved along the shaft E beyond the point necessary to disengage the friction-clutch far enough to allow sufficient motion to the link $K^2$ to actuate the clutch-pins $I^4$, as hereinbefore or hereinafter described.

The connecting-links $K^2$ are engaged by the upper forked end of a shifting arm $K^3$, forming part of the shifting device K and secured on a rock-shaft $K^4$, (see Fig. 8,) journaled in suitable bearings and provided with a downwardly-extending arm $K^5$, connected by a link $K^6$ with an arm L', secured on a transversely-extending shaft L, carrying at one end a hand-lever $L^2$ for conveniently turning the said shaft L to cause the arm L' to shift the link $K^6$ to impart a swinging motion to the arm $K^5$, and, consequently, a rocking motion to the shaft $K^4$, so that the arm $K^3$ swings to move the connecting-links $K^2$ longitudinally to shift the clutches I and J, as hereinafter more fully described.

From the shaft L extends downward an arm $L^3$, engaging an elongated pocket N', held on a shifting bar N, extending to all the compound driving arrangements of the several individual machines in the paper-making machine. On the shifting bar N, next to the pocket N', is arranged a second pocket $N^2$, engaged by the lower end O' of a lever O, fulcrumed at $O^2$ and under the control of the operator, so as to impart a sliding motion to the shifting bar N to simultaneously actuate all the arms $L^3$ to shift the clutches I and J of all the individual machines simultaneously, as hereinafter more fully described.

The operation is as follows: When the levers $L^2$ and O are in a vertical position, as illustrated in Fig. 3, and the tightening-pulley H does not press the belt C, then no power is transmitted from the main-line shaft A to the individual machines of the paper-making machine. When the operator desires to start an individual machine, he first moves the lever $L^2$ to the right (see Fig. 4) to cause the arm $K^3$ to swing in a like direction and to move the disk $I^5$ of the positive clutch I to the right, so that the pins $I^4$ engage the recess $I^2$ of the disk I', secured on the shaft E. The operator also turns the hand-wheel $H^7$ so as to move the tightening-pulley H in contact with one run of the belt C, so that the motion of the small pulley B is transmitted by the belt C to the slow-speed pulley D and by the clutch I to the shaft E, which by the pinion F engaging the beveled gear-wheel F' causes a rotation of the shafts $F^2$ and $F^4$, whereby the individual machine is started. The operator keeps turning the hand-wheel $H^7$, so that the tightening-pulley H finally tightens the belt C very strongly to prevent slipping, so that a gradually-increased turning motion is given to the machine from its first starting. When the tightening-pulley H is firmly moved in contact with the belt, then the machine runs at a comparatively low rate of speed and the operator in order to increase the speed moves the lever $L^2$ to the left, so that the arm $K^3$ swings in a like direction into the position shown in Fig. 5, whereby the positive clutch remains in engagement, owing to the slots K' passing the pins $I^7$, while at the same time the friction-clutch J is actuated so as to connect the fast-speed pulley D' with the shaft E, whereby the rotary motion transmitted from the large pulley B' and belt C' to the said pulley D' is gradually and finally transmitted to the shaft E. As the latter now rotates at a higher rate of speed than the pulley D and the disk I' is carried around at a higher rate of speed than the pins or bars $I^4$, the said disk causes the bars $I^4$ to slide to the left, owing to the inclined backs $I^3$ of the recesses $I^2$, (see Fig. 7,) whereby the said bars are moved out of engagement with the disk I'. The positive clutch is thus automatically thrown out of gear as soon as the speed of the shaft E increases beyond the speed of the pulley D. The operator then moves the tightening-pulley H outward away from the belt C to slacken the latter and the motion of the counter-shaft A is solely transmitted by the pulley D' to the shaft E, geared with the machine to be driven.

When all the machines are desired to be set in motion simultaneously, then the operator instead of manipulating the lever $L^2$ manipulates the lever O in the same manner as above described in reference to the lever $L^2$, it being understood that the shifting bar N transmits the motion received from the said lever O to all the individual arms $L^3$, connected with the positive and friction clutches, as previously described.

Figure 10:
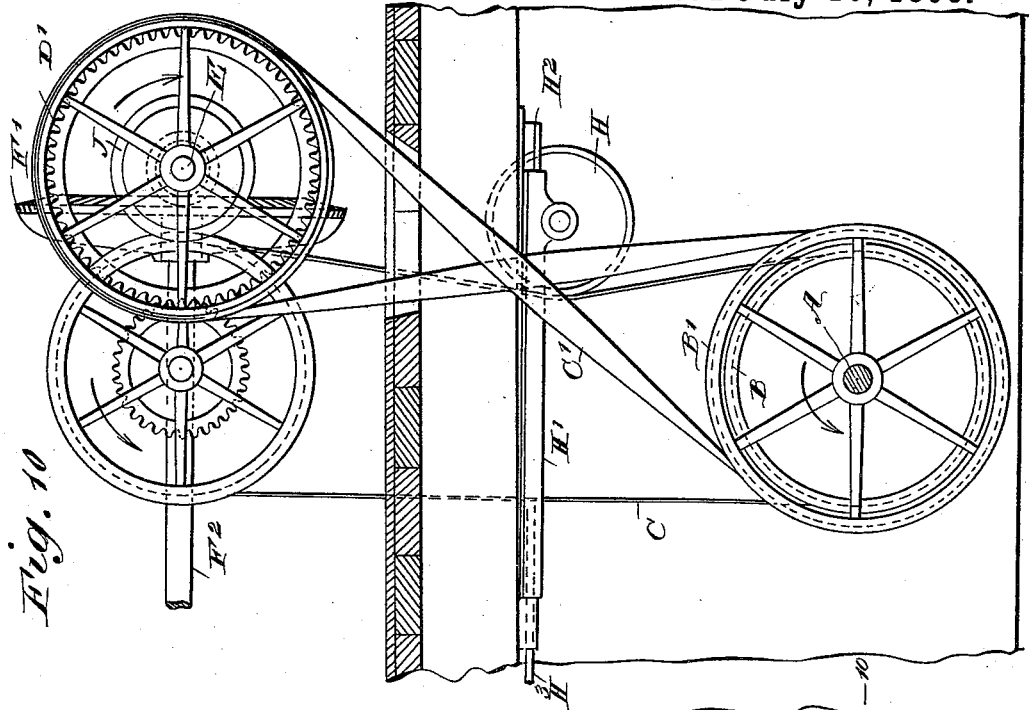

As illustrated in Figs. 9 and 10, the slow-speed pulley D is on a separate shaft E', connected by a pinion $D^2$ with a gear-wheel $D^3$, held loosely on the shaft E, and adapted to be locked thereto by the positive clutch I in the same manner as the latter locks the slow-speed pulley D to the said shaft, as previously described. The operation of this device is exactly the same as above described, the only difference being the additional transmitting gear-wheels $D^2$ and $D^3$. The belt C' connecting the pulley B' with the fast-speed pulley D' is necessarily crossed, as indicated in Fig. 10.

It is understood that in running paper-making machines the maximum rate of speed is not fixed and unalterable, but preferably arranged so that the fastest or highest speed transmitted by the slow-speed pulleys B D and belt C is about one-half of the speed at which it is desired to run the machine. For instance, if it is desired to make paper at a speed of five hundred feet per minute the slow-speed arrangement will run at a speed of two hundred and fifty feet per minute. Thus when the machine is first started it is moved from a state of rest to a speed of two hundred and fifty feet per minute by the slow-speed arrangement and then up to five hundred feet per minute by the fast-speed device.

Having thus fully described my invention, I claim as new and desire to secure by Letters Patent—

1. A compound driving gear, comprising a fast speed pulley and a slow speed pulley, both adapted to be connected with the driving shaft, a friction clutch for locking the fast speed pulley to the driving shaft, and a positive clutch for locking the slow speed pulley to the driving shaft, the said clutches being so arranged that when the speed is changed from the slow to the fast, the positive clutch will not be unlocked from the driving shaft until and after such instant of time as the fast speed pulley becomes locked by its friction clutch to the driving shaft, substantially as shown and described.

2. A compound driving gear, comprising a driven shaft carrying a large and a small pulley, a fast speed pulley connected by a belt with the said large pulley, a slow speed pulley connected by a belt with the small pulley, a driving shaft on which the said fast speed pulley and slow speed pulley are held loosely, a friction clutch for locking the fast speed pulley to the said driving shaft, and a positive clutch for locking the slow speed pulley to the said driving shaft, the said clutches being so arranged that when the speed is changed from the slow to the fast, the positive clutch will not be unlocked from the driving shaft, until and after such instant of time as the fast speed pulley becomes locked by its friction clutch to the said driving shaft, substantially as shown and described.

3. A compound driving gear, comprising a driven shaft carrying a large and a small pulley, a fast speed pulley connected by a belt with the said large pulley, a slow speed pulley connected by a belt with the said small pulley, a driving shaft on which the said fast speed pulley and slow speed pulley are held loosely, a friction clutch for locking the fast speed pulley to the said driving shaft, and a positive clutch for locking the slow speed pulley to the said driving shaft, the said positive clutch being arranged in such a manner that when the friction clutch locks its fast speed pulley to the driving shaft, the said positive clutch is automatically thrown out of gear to disconnect the slow speed pulley from the driving shaft, substantially as shown and described.

4. A compound driving gear, comprising a driven shaft carrying a large and a small pulley, a fast speed pulley connected by a belt with the said large pulley, a slow speed pulley connected by a belt with the said small pulley, a driving shaft on which the said fast speed pulley and slow speed pulley are held loosely, a friction clutch for locking the fast speed pulley to the said driving shaft, and a positive clutch for locking the slow speed pulley to the said driving shaft, the said positive clutch being arranged in such a manner that when the friction clutch locks its fast speed pulley to the driving shaft, the said positive clutch is automatically thrown out of gear to disconnect the slow speed pulley from the driving shaft, and a shifting device common to both clutches for actuating the same from a single lever, substantially as shown and described.

5. A compound driving gear, comprising a driven shaft carrying a large and a small pulley, a fast speed pulley connected by a belt with the said large pulley, a slow speed pulley connected by a belt with the said small pulley, a driving shaft on which the said fast speed pulley and slow speed pulley are held loosely, a friction clutch for locking the fast speed pulley to the said driving shaft, and a positive clutch for locking the slow speed pulley to the said driving shaft, the said positive clutch being arranged in such a manner that when the friction clutch locks its fast speed pulley to the driving shaft, the said positive clutch is automatically thrown out of gear to disconnect the slow speed pulley from the driving shaft, and a tightening pulley for the belt connecting the small pulley with the slow speed driving pulley, substantially as shown and described.

6. A compound driving gear, comprising a driven shaft carrying a large and a small pulley, a fast speed pulley connected by a belt with the said large pulley, a slow speed pulley connected by a belt with the said small pulley, a driving shaft on which the said fast speed pulley and slow speed pulley are held loosely, a friction clutch for locking the fast speed pulley to the said driving shaft, a positive clutch for locking the slow speed pulley to the said driving shaft, the said positive clutch being arranged in such a manner that when the friction clutch locks its fast speed pulley to the driving shaft, the said positive clutch is automatically thrown out of gear to disconnect the slow speed pulley from the driving shaft, a shifting device common to both clutches for actuating the same from a single lever, and a shifting bar connecting with the several shifting devices to permit the operator to simultaneously start all the machines in the series, substantially as shown and described.

7. A compound driving gear, comprising a shaft, two wheels loosely mounted thereon and adapted to be rotated at different rates of speed and connected clutches held to rotate with the shaft and slidable thereon to engage the said loose wheels, one of the clutches having a limited sliding movement on the part connecting it to the other clutch, substantially as described.

THOMAS H. SAVERY.

Witnesses:
WM. T. WILMANS,
CONRAD F. AUSTERMUHL.